United States Patent
Xiang

(10) Patent No.: US 9,312,687 B2
(45) Date of Patent: Apr. 12, 2016

(54) OVER CURRENT AND SHORT CIRCUIT PROTECTION DEVICE AND METHOD FOR ELECTRONIC CIGARETTE

(71) Applicant: Zhiyong Xiang, Guangdong (CN)

(72) Inventor: Zhiyong Xiang, Guangdong (CN)

(73) Assignee: HUIZHOU KUMREE TECHNOLOGY CO., LTD. SHENZHEN BRANCH, Shenzhen (CN)

(*) Notice: Subject to any disclaimer, the term of this patent is extended or adjusted under 35 U.S.C. 154(b) by 93 days.

(21) Appl. No.: 13/859,472

(22) Filed: Apr. 9, 2013

(65) Prior Publication Data
US 2014/0254055 A1    Sep. 11, 2014

(30) Foreign Application Priority Data
Mar. 5, 2013 (CN) .......................... 2013 1 0069371

(51) Int. Cl.
*H02H 3/00* (2006.01)
*H02H 7/20* (2006.01)
*A24F 47/00* (2006.01)
*H02H 3/087* (2006.01)

(52) U.S. Cl.
CPC ............... *H02H 7/20* (2013.01); *A24F 47/008* (2013.01); *H02H 3/087* (2013.01)

(58) Field of Classification Search
CPC ........................................................ H02H 7/20
USPC ............................................. 361/86, 87, 93.1
See application file for complete search history.

(56) References Cited

U.S. PATENT DOCUMENTS

| | | | |
|---|---|---|---|
| 8,000,072 B2* | 8/2011 | Bauer et al. ..................... 361/87 |
| 2012/0229945 A1* | 9/2012 | Sakurai et al. .................. 361/86 |
| 2013/0104916 A1* | 5/2013 | Bellinger et al. ............. 131/328 |
| 2013/0335057 A1* | 12/2013 | Paul et al. ..................... 323/315 |

* cited by examiner

*Primary Examiner* — Thienvu Tran
*Assistant Examiner* — Tien Mai
(74) *Attorney, Agent, or Firm* — Tim Tingkang Xia, Esq.; Locke Lord LLP

(57) ABSTRACT

The present invention discloses a control device and method for over current or short circuit protection of electronic cigarette. The control device includes an input module, a power module, a heating element, a switch control module, a comparator, and a FET; the FET is used to detect an operating voltage generated by an operating current following through the internal resistance of the FET, and the operating voltage is transmitted to the comparator; the comparator compares a reference voltage with the operating voltage, and output a potential signal to the switch control module, the switch control module turns off the FET or maintains it turning on corresponding to the potential signal, further the FET powers off or powers on the heating element. Therefore the circuit of electronic cigarette is protected in over current or short circuit condition.

1 Claim, 5 Drawing Sheets

OVER CURRENT AND SHORT CIRCUIT PROTECTION DEVICE AND METHOD FOR ELECTRONIC CIGARETTE

CROSS-REFERENCE TO RELATED APPLICATIONS

This non-provisional application claims priority under 35 U.S.C. §119(a) on Patent Application No. 201310069371.0, filed in P.R. China on Mar. 15, 2013, the entire contents of which are hereby incorporated by reference.

FIELD OF THE INVENTION

This present invention relates to the field of electric heating products, and in particular, to an over-current and short-circuits protection device and method for electronic cigarette.

BACKGROUND OF THE INVENTION

An electronic cigarette, heating and atomizing the liquid smoke in the electronic cigarette, provides a cigarette substitute for smokers. It is becoming more popular. The electronic cigarette comprises a battery, a control circuit, an atomizer having a heating element as well as other units. For some electronic cigarettes, the heating element is activated by the control circuit according to a signal either from an electronic airflow sensor detecting the aspiratory by smokers or from a key pressed by smokers, then smoking begins.

The heating element of the electronic cigarette is prone to the partial short circuit or dead short because of contacting with liquid smoker and moisture, resulting in an over current or short-circuits current in the main circuit of the electronic cigarette. If the over current or short-circuit current not be cut off soon, it will causes the circuit burning or fire.

Nowadays, in the mechanical or microcontroller electronic cigarette products, some have not over current or short-circuit protection circuits. Even if some have over current or short-circuit protection circuit, the current detecting sensor inside the protection circuit is configured as a resistor or a current transformer, the protection circuit is relatively complex, and expensive.

The prior art has defects and needs to be improved.

SUMMARY OF THE INVENTION

To resolve the problem of the prior art with the relatively complex and expensive protection circuit, the present invention provides a relatively simple control device and method for over current or short circuit protection circuit in which the internal resistance of the field effect transistor (hereinafter, referred to as "FET") is configured as a current detection sensor.

A technical solution adopted by the present invention is: A method of an over current or short-circuit protection control method for the electronic cigarette, comprising the following steps:

Pre-set a reference voltage;

Real-time detecting an operating voltage generated by an operating current flowing through the internal resistance of the FET.

The comparator compares the reference voltage with the operating voltage and outputs a potential signal to the switch control module according to the comparison result, the switch control module turns off the FET or maintains it turning on corresponding to the potential signal, wherein the comparator judges whether the operating voltage is lower than the reference voltage, if so, the switch control module generates a high potential signal to the FET and maintains the FET turning on, otherwise the switch control module generates a low potential signal to FET and turns off it, then heating element being powered off.

The control method for over current or short circuit protection, wherein the reference voltage is a voltage generated by a pre set over current flowing through the internal resistance of the FET.

The control method for over current or short circuits protection, wherein the switch control module is micro-controller or semiconductor switch.

A control device for over current or short circuit protection of electronic cigarette comprises an input module, a power supply module and a heating element, the heating element which is used to heat and further atomize liquid smoke of electronic cigarette, further comprises a comparator, a FET and a switch control module, the switch control module which is respectively coupled to the input module, the power supply module, the comparator as well as the FET.

The EFT is used to detect an operating voltage generated by an operating current following through the internal resistance of the FET, and the operating voltage is transmitted to the comparator The comparator compares the reference voltage with the operating voltage and output a potential signal to the switch control module according to the comparison result.

The switch control module turns off the FET or maintains the FET turning on according to the potential signal from the comparator.

The power supply module is used to provide power to the switch control module, and also to provide power the heating element via the FET.

A control device for over current or short circuit protection, wherein the potential signal from the comparator is a high potential signal or low potential signal, if the operating voltage is lower than the reference voltage, the switch control module generates a high potential signal to the FET corresponding to the potential signal from the comparator and maintains the FET turning on, then the heating element working continually; if the operating voltage is higher than the reference voltage, which means that the operating current is in over current or short circuit condition, then the switch control module generates a low potential signal to FET corresponding to the potential signal from the comparator and turns off the FET, so the heating element being powered off.

The control device for over current or short circuit protection, wherein the reference voltage is a voltage generated by a preset over current following through the internal resistance of the FET.

The control device for over current or short circuits protection, wherein the switch control module is configured as a micro-controller or semi-conductor switch.

The control device for over current or short circuit protection, wherein the output terminal of the comparator is coupled to the detection input terminal of the micro controller, the output terminal of the micro controller is coupled to the gate of the FET, the source of the FET is coupled to the negative terminal of the power supply module, the drain of the FET connected to the heating element is coupled to the input terminal of the comparator.

The control device for over current or short protection, wherein the comparator is built in the micro controller.

The present invention discloses an control device and method for over current or short circuit protection of electronic cigarette, having the following beneficial effects: real-time detecting the FET's operating voltage generated by the FET's operating current following through its internal resistance, the comparator compares a reference voltage with the operating voltage and generates a control signal to the switch control module, when over current or short circuit occurs in the circuit of the electronic cigarette, the switch control module generates a control signal to FET corresponding to the control signal from the comparator and turns off the FET, further the heating circuit for heating element is powered off.

It would be advantageous to use the internal resistance of a FET as a current detection sensor, not having to use extra current detection sensor like a resistor or a current transformer, in the protection circuit. The present invention has a simple circuit structure and low cost characteristics.

BRIEF DESCRIPTION OF THE DRAWING

The present invention is illustrated by way of example and not limitation in the figures of the accompanying drawings, in which like references indicate similar elements and in which.

DETAILED DESCRIPTION OF THE PREFERRED EMBODIMENTS

To resolve the problem of the prior art, which was used resistance or current transformer as a current detection sensor, with the relatively complex and expensive protection circuit, the core technology of the present invention is that an internal resistance of the FET is configured as a current detection sensor of an over current or short circuit protection circuit. When an operating current follows through the internal resistance of the FET, an operating voltage of the FET is generated and transmitted to a input terminal of the comparator, the comparator compares the operating voltage with a reference voltage and output a potential signal to switch control module according to the comparison result, if the operating voltage is lower than the reference voltage, the switch control module generates a high potential signal to the FET corresponding the potential signal from the comparator and maintains the FET turning on, then the heating element working continually; If the operating voltage is higher than the reference voltage, which means that the operating current is in over current or short circuit condition, then the switch control module generates a low potential signal to FET corresponding the potential signal from the comparator and turns off the FET, so the heating element being powered off, to protect the electronic cigarette.

In order to make the object of the present invention, the technical solutions and the advantages more clear. Below conjunction drawings with exemplary embodiments, the present invention will be further described, It is to be understood that the prevent invention is not limited thereto.

Figure 1:
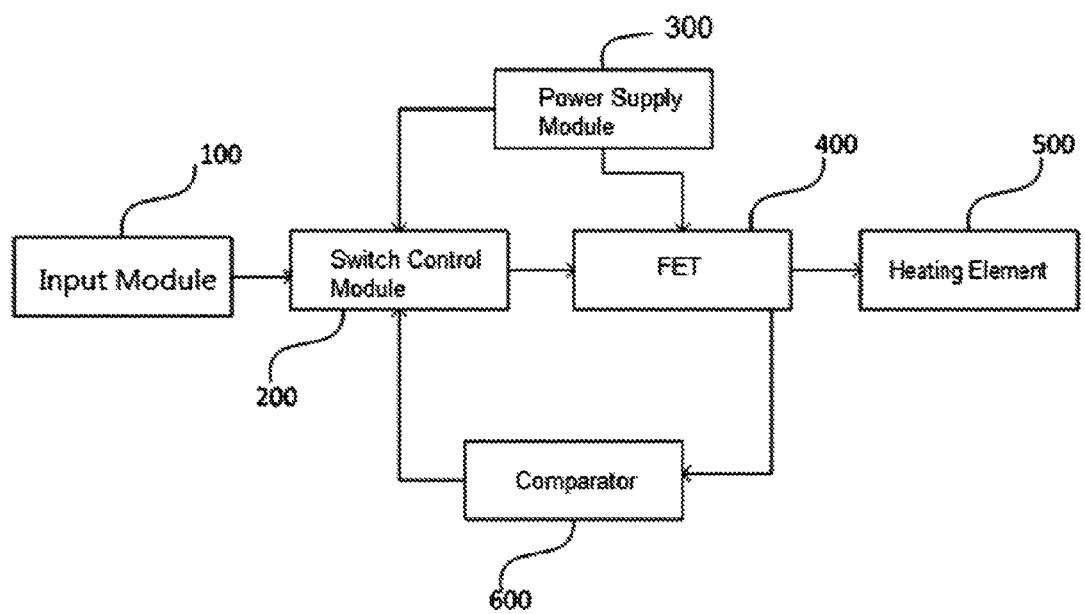
FIG. 1 is a circuit block diagram of a control device showing over-current or short circuit protection according to the present invention.

FIG. 1 is a circuit block diagram of a control device showing over-current or short circuit protection according to the present invention.

Usually a FET in an electronic cigarette is only used to switch or control the power supply to the heating element of the electronic cigarette according to user operation. The present invention uses the internal resistance of a FET as a current detection sensor to detecting an operating current following through the FET, a comparator or an ADC is used to confirm that the operating current is in over current or short circuit state, and further the FET is turned off to protect the electronic cigarette.

The control device mainly includes an input module 100, a switching control module 200, a power supply module 300, a FET 400, a heating element 500 and a comparator 600, wherein input module 100 coupled to switch control module 200 comprises an airflow sensor or key, the airflow sensor senses user's aspiratory to start heating element 500, which can be also started by the key pressed by the user through switch control module 200, then heating element 500 is heated. Switch control module 200 is respectively connected to FET 400, comparator 600 and power module 300 which provides power supply to both switch control module 200 and heating element 500 via FET 400. The heating element is used to heat and further atomize the smoke liquid of electronic cigarette. FET 400 is respectively coupled to switch control module 200, power supply module 300, heating element 500 and comparator 600, FET 400 is also used to real time detect the operating voltage generated by the operating current following through its internal resistance, the operating voltage is transmitted to comparator 600 which compares the operating voltage with a reference voltage and outputs a potential signal to switch control module 200 according to the comparison result.

Switch control module 200 turns off FET 400 or maintains it turning on corresponding to the potential signal from comparator 600. The potential signal from comparator 600 is a low or high potential signal. If the operating voltage is lower than the reference voltage, switch control module 200 generates a high potential signal to FET 400 corresponding to the potential signal from the comparator 600 and maintains it turning on, then the heating element working continually. If the operating voltage is higher than the reference voltage, which means that the FET 400 operating current is in over current or short circuit condition, then switch control module 200 generates a low potential signal to FET 400 corresponding to the potential signal from the comparator 600 and turns off the FET, so the heating element being powered off to protect the circuit of electronic cigarette.

Figure 2:
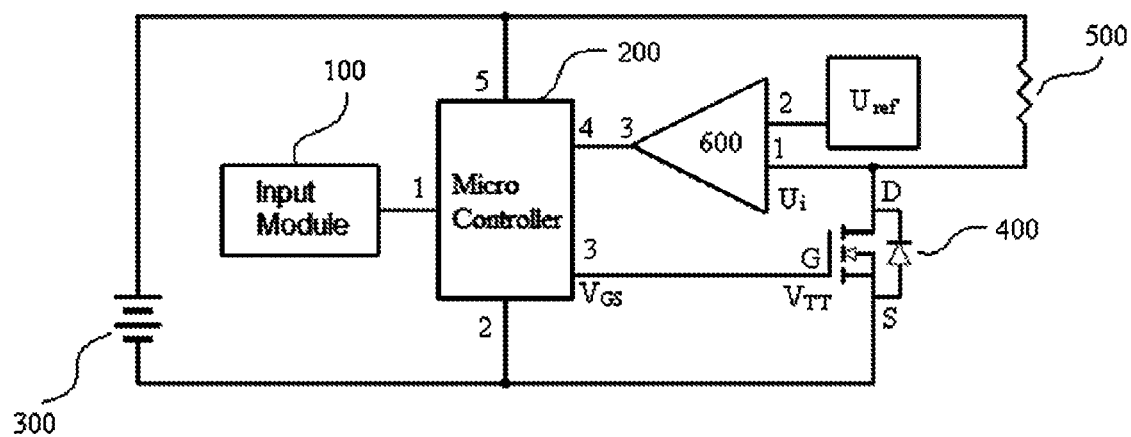
FIG. 2 is a circuit schematic diagram of a first of a control device showing over-current or short circuit protection according to one exemplary embodiment of the present invention.

FIG. 2 is a circuit schematic diagram of a first exemplary embodiment of a control device showing over-current or short circuit protection according to the present invention.

Micro-controller 200 as switch control module can be configured as microcontroller (such as model Sn8P2711B or 89C51), CPU, or logic control device (such as model EPM3032A). Micro-controller 200 in the exemplary embodiment has at least 5 pins. Pin 1 as signal input terminal connected to an airflow sensor or key which is use to get a control signal from the airflow sensor or key to start heating element 500. Pin 2 and pin 5 are as power supply terminals, pin 3 as output terminal provides a voltage $V_{GS}$ to control FET 400, pin 4 as input terminal $V_I$ receives a potential signal from the output terminal of comparator 600 according to the comparison result.

Comparator 600 has an input terminal 2 for receiving reference voltage which is preset (e.g., set as 5V), and equate to a voltage generated by a pre-set over current following through the internal resistance of FET 400;

Comparator 600 also includes an input terminal 1 for receiving the operating voltage and an output terminal 3 to output the potential signal. The output terminal 3 of comparator 600 is connected to the pin 4 of microcontroller 200.

FET 400 has gate terminal G, supply terminal S and drain terminal D, the S of FET 400 is connected to the negative terminal of power supply module 300 (power supply module as battery module in this embodiment), The D of FET 400 is connected to the input terminal 1 of comparator 600 and the one terminal of heating element 500. Comparator Model in this embodiment may preferably be the LM393, FET 400 Model may preferably be AO3400 or DTS2300, of course, the actual application is not limited to the above selected model.

Figure 3:
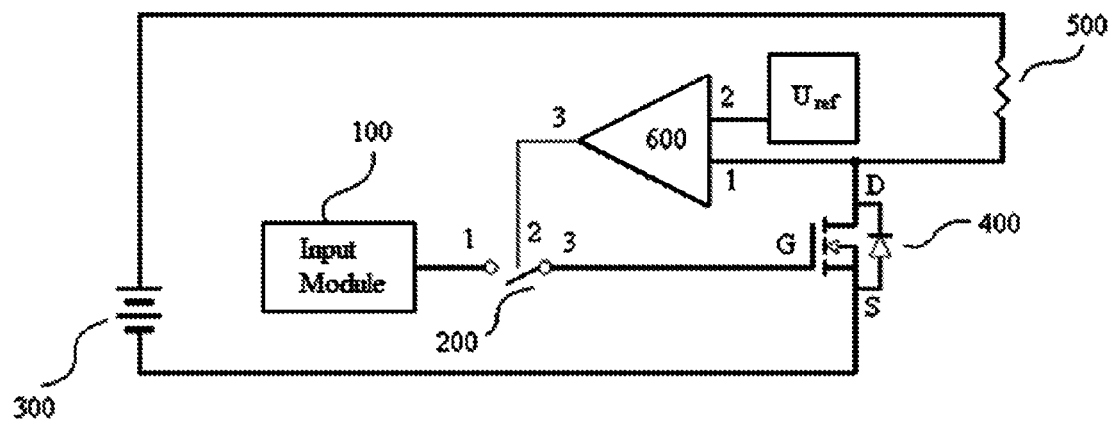
FIG. 3 is a circuit schematic diagram of a second exemplary embodiment of a control device showing over-current or short circuit protection according to the present invention.

FIG. 3 is a circuit schematic diagram of a second exemplary embodiment of a control device showing over-current or short circuit protection according to the present invention, the circuit comprises an input module 100 which can be airflow sensor or key, semiconductor switch 200, battery 300, i.e. the power supply module 300 in FIG. 1, FET 400, heating element 500 and comparator 600, the difference between FIG. 3 and FIG. 2 is that using the semiconductor switch 200 in FIG. 3 replaces the micro controller 200 in FIG. 2, the remaining part of the circuit connection relationships in FIG. 3 are the same as FIG. 2, only semiconductor switch 200 connection relationships is described: the input terminal 1 of semiconductor switch 200 is coupled to the output terminal of airflow sensor or key module 100, the input terminal 2 of semiconductor switch 200 is coupled to the output terminal 3 of comparator 600, the terminal 3 of semiconductor switch 200 is coupled to the gate terminal G of FET 400, the remaining elements connection relationship in FIG. 3 is same as in FIG. 2.

Figure 4:
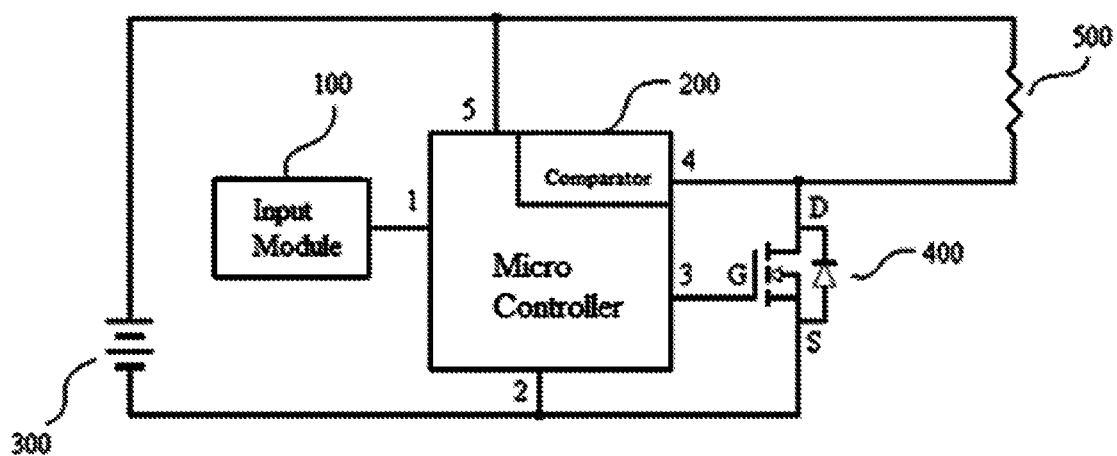
FIG. 4 is a circuit schematic diagram of a third exemplary embodiment of a control device showing over-current or short circuit protection according to the present invention.

With reference to FIG. 4, semiconductor switch 200 receives an instruction from user through the airflow sensor or key in input module 100 to start heating element 500, i.e., airflow sensor senses user's aspiratory or key is pressed by user in input module 100, then an instruction signal from input module 100 is output to semiconductor switch 200, which starts heating element 500 through FET 400, then smoking; the working principle is same as above described, FET 400 real time detecting a operating voltage generated by an operating current following through it's internal resistance, comparator 600 receives the operating voltage and compares it with a pre set reference voltage, (e.g., if the operating voltage is higher than the reference voltage, the comparator outputs a low potential signal "0", otherwise, the comparator output a high potential signal "1"), and output a potential signal according the comparison result to semi conductor switch 200, corresponding to the potential signal from comparator 600, semi conductor switch 200 output a control signal to FET to maintain FET 400 turning on for heating element 500 working continually or turn off FET 400 for heating element 500 being powered off, to protect the circuit of electronic cigarette.

Figure 5:
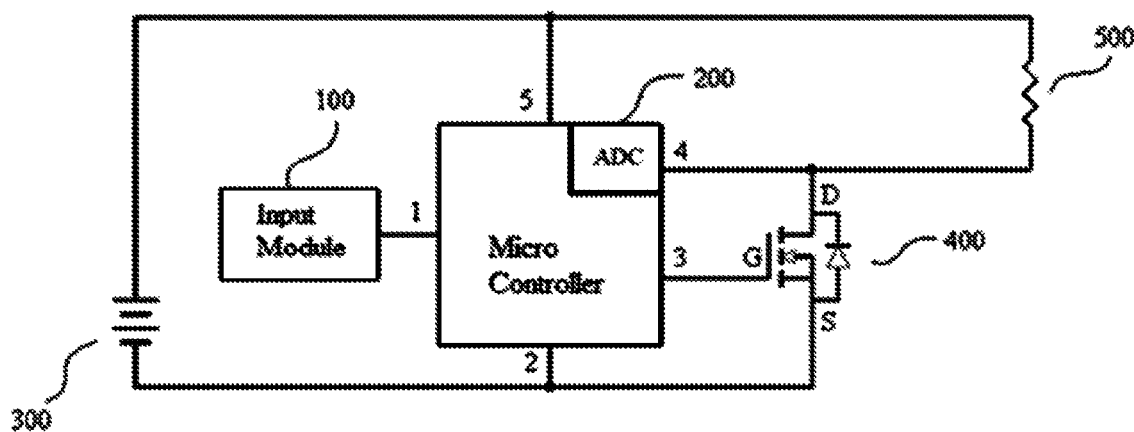
FIG. 5 is a circuit schematic diagram of a fourth exemplary embodiment of a control device showing over-current or short circuit protection according to the present invention.

FIG. 4 and FIG. 5 are circuit schematic diagrams of third and fourth exemplary embodiments of control devices showing over-current or short circuit protection according to the present invention. In FIG. 4, comparator 600 is built in micro controller 200. In FIG. 5, the analog to digital converter ADC of micro controller 200 is use to receive the operating voltage of FET 400, for detecting the operating current following through FET 400. When over current or short circuit condition happens in the main circuit of electronic cigarette, micro controller will turn off FET 400 to protect the circuit.

Figure 6:
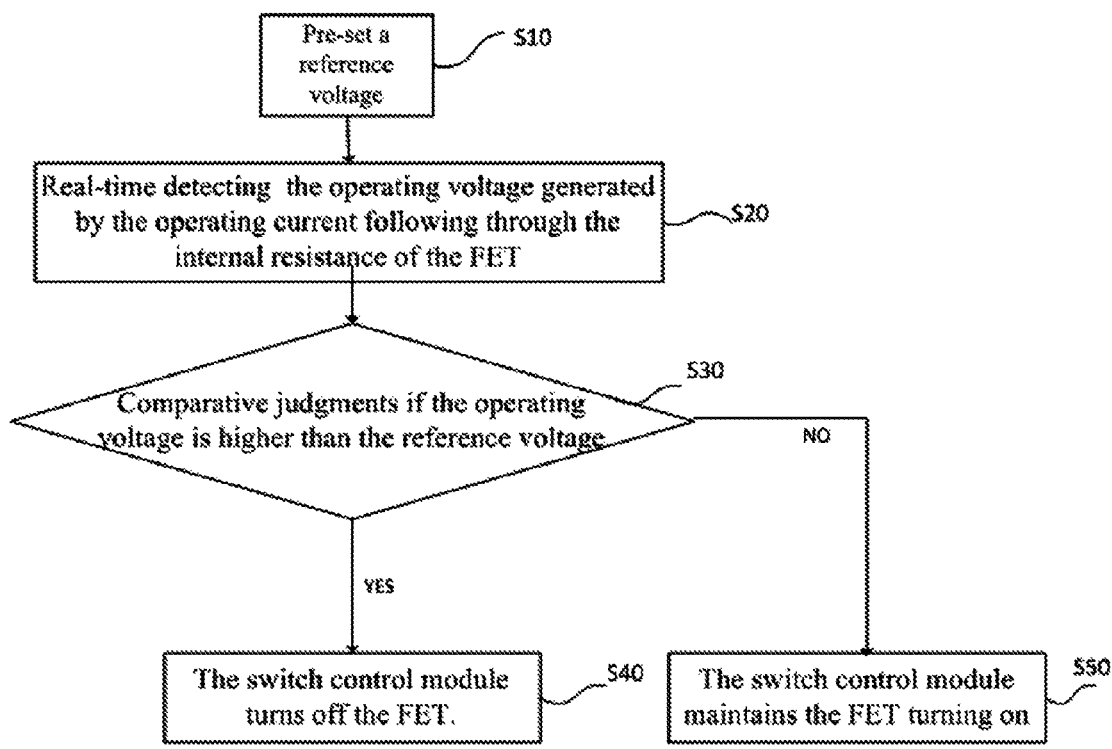
FIG. 6 is control flow chart showing over current or short-circuits protection when the electronic cigarette is in an energized state according to the present invention.

The following control process to describe an over current or short-circuit protection of the electronic cigarette according to FIG. 6, including the following steps:

S10. Presets a reference voltage, the reference voltage generated by a preset overcurrent current following through the internal resistance of the FET;

S20. Real time detecting an operating voltage of the FET generated by an operating current following through the internal resistance of the FET;

S30. Comparator compares the operating voltage with the reference voltage.

And determines if the operating voltage is higher than the reference voltage; if yes, go to step 40, otherwise go to step 50;

S40. Switch control module turns off the FET, making the heating element power off;

S50. Switch control module maintains the FET turning on.

Specifically the comparator according to the comparison result outputs a potential signal to switch control module, i.e., micro controller or semi conductor switch which further turns off the FET or maintains it turns on according to the potential signal. If the operating voltage is lower than the reference voltage, the comparator outputs a low potential signal to the micro controller or semi conductor switch, according the low potential signal, the micro controller or semi conductor switch outputs a high potential signal to the FET and maintains it turning on, otherwise the comparator outputs a high potential signal to micro controller or semi conductor switch, according to the high potential signal, the micro controller or semi conductor switch outputs a low potential signal to the FET and turns off it.

Further process including:
1. User pressing the key in the electronic cigarette or airflow sensor in the electronic cigarette sensing user Smoking, a starting signal is transmitted to the micro controller.
2. The micro controller outputs a voltage $V_{GS}$, $V_{GS}$ is higher than $V_{TT}$ which is the FET threshold voltage, then the FET is being turned on, the operating current follows from the positive of the power supply module (i.e., the battery), through the heating element, the D of the FET, the S of the FET to the negative of the power supply.
3. Heating element working in heating state.
4. The comparator detects Ui voltage, wherein,
   Ui represented the operating voltage of FET; i.e. The D terminal of the FET voltage;
   I represented the operating current following through the heating element and the FET;
   $R_o$ represented the internal resistance of the FET;
   (When $V_{GS}$ remains unchanged, the internal resistance value is a fixed value)
   According to Ohm's law: Ui=I*$R_o$;
5. I over current represented the preset over current;
   $U_{REF}$ represented the preset reference voltage of the comparator; According to Ohm's law: $U_{REF}$=I over current*$R_o$.
6. When Ui>$U_{REF}$, proving I>I over current, then the comparator and the microcontroller action, which outputs a voltage VGS to the gate of the FET, because the $V_{GS}$<$V_{TT}$, the FET being turned off.

In summary the present invention using the internal resistance of a FET as a current detection sensor, mostly the FET being used to control the heating element working, and using a comparator or ADC to determine the condition of over current or short circuit in the main circuit of electronic cigarette, further through a micro controller turning off the FET to power off the heating element. The circuit of the present invention is simple, low cost, and effective to achieve protection of an over current or short-circuit of the electronic cigarette.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the inventions as defined in the appended claims.

The invention claimed is:

1. A control device for over current or short circuit protection of an electronic cigarette, comprising
an input module,
a heating element used to heat and further atomize liquid tobacco of the electronic cigarette,
a microcontroller with a built-in analog-to-digital converter,
a power supply module used to power the microcontroller and the heating element, and
a FET with a drain-to-source internal resistance when the FET conducts;
wherein the microcontroller is respectively coupled to said input module and said FET; one node of the heating element is directly connected to an anode of the power supply module, the other node of the heating element is directly connected to the drain of the FET, the source of the FET is grounded and the gate of the FET is connected to an output of the microcontroller; an input of the analog-to-digital converter is connected to the drain of the FET to sample an analog signal which is then converted into a digital signal by the analog-to-digital converter;
the microcontroller is configured to turn on the FET when receiving a first input signal from the input module, to determine whether the digital signal is greater than a pre-set value which is equal to the product of the internal resistance and a predetermined overcurrent of the FET, and then to turn off the FET when the digital signal is greater than the pre-set value.

* * * * *